United States Patent
Murar et al.

(10) Patent No.: US 10,617,107 B2
(45) Date of Patent: Apr. 14, 2020

(54) TACKLE BOX FOR CHARGING ELECTROLUMINESCENT LURES

(71) Applicant: JVIS USA, LLC, Sterling Heights, MI (US)

(72) Inventors: Jason T. Murar, Macomb, MI (US); Douglas Cleland, Metamora, MI (US); Darius J. Preisler, Macomb, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 328 days.

(21) Appl. No.: 15/636,990

(22) Filed: Jun. 29, 2017

(65) Prior Publication Data

US 2019/0000058 A1    Jan. 3, 2019

(51) Int. Cl.
*A01K 97/06* (2006.01)
*A01K 85/01* (2006.01)

(52) U.S. Cl.
CPC .............. *A01K 97/06* (2013.01); *A01K 85/01* (2013.01)

(58) Field of Classification Search
CPC ................................ A01K 97/06; A01K 85/01
USPC ................... 43/17.5, 17.6, 54.1; 206/315.11; 224/920
See application file for complete search history.

(56) References Cited

U.S. PATENT DOCUMENTS

| | | | | |
|---|---|---|---|---|
| 2,220,817 A | * | 11/1940 | Holmes | A01K 97/06 43/57.1 |
| 2,290,419 A | * | 7/1942 | Dunn | A01K 97/06 362/156 |
| 2,517,914 A | * | 8/1950 | Nowaczek | A01K 97/06 362/155 |
| 2,711,050 A | * | 6/1955 | McIntyre | A01K 97/06 43/57.1 |
| 2,751,489 A | * | 6/1956 | Cole | A01K 97/06 362/156 |
| 3,346,733 A | * | 10/1967 | Woolworth | B25H 3/023 362/156 |
| 3,490,169 A | * | 1/1970 | Tweed | A01K 97/06 43/57.1 |
| 3,739,518 A | * | 6/1973 | Ziegler | A01K 97/06 43/57.1 |

(Continued)

FOREIGN PATENT DOCUMENTS

| | | | |
|---|---|---|---|
| JP | 09000132 A | * | 1/1997 |
| JP | 11289944 A | * | 10/1999 |

(Continued)

*Primary Examiner* — Darren W Ark
(74) *Attorney, Agent, or Firm* — Brooks Kushman P.C.

(57) ABSTRACT

A tackle box for charging electroluminescent lures comprises a container having an interior volume; a cover mateable with the container; one or more racks for receiving and retaining lures, where each rack has a substantially planar shape, is positionable in tracks formed in the interior of the container, and has an array of recesses formed in an upper end to hold lures; a light-transmissive shelf positionable in the container above the one or more racks; and an array of light sources carried on the shelf and energizeable to illuminate electroluminescent lures retained on the one or more racks. The racks can be arrayed in parallel tracks formed in the interior side walls of the container. Each rack is preferably formed with a scallop pattern of recesses on its upper end to hold lures for charging.

10 Claims, 5 Drawing Sheets

(56) References Cited

U.S. PATENT DOCUMENTS

| | | | | |
|---|---|---|---|---|
| 3,775,895 A * | 12/1973 | Jachim | A01K 97/06 | 43/54.1 |
| 3,797,161 A * | 3/1974 | Smallwood | A01K 97/06 | 43/57.1 |
| 3,938,132 A * | 2/1976 | Cunningham | A01K 97/06 | 340/321 |
| 4,245,422 A * | 1/1981 | Souza | A01K 97/06 | 206/315.11 |
| 4,610,103 A | 9/1986 | Steinman | | |
| 4,638,593 A * | 1/1987 | Garcia | A01K 97/06 | 43/54.1 |
| 4,691,470 A * | 9/1987 | Landell | A01K 97/06 | 362/191 |
| 4,697,379 A * | 10/1987 | McPhaul | A01K 97/06 | 206/315.11 |
| 4,729,474 A * | 3/1988 | Lanius | A01K 97/06 | 206/315.1 |
| 4,829,699 A * | 5/1989 | Perkins | A01K 97/06 | 43/54.1 |
| 4,936,044 A * | 6/1990 | Bruce | A01K 97/06 | 43/57.1 |
| 5,269,087 A * | 12/1993 | Johnston | A01K 85/01 | 43/25 |
| 5,311,413 A * | 5/1994 | Farmer | F21V 33/008 | 362/154 |
| 5,333,408 A * | 8/1994 | Simmons | A01K 97/06 | 362/154 |
| 5,388,039 A * | 2/1995 | Dolph | A01K 85/01 | 250/459.1 |
| 5,505,354 A * | 4/1996 | Hutton | A01K 97/06 | 224/196 |
| 5,507,113 A * | 4/1996 | Keller | A01K 97/05 | 206/315.11 |
| 5,611,170 A * | 3/1997 | McGuff | A01K 97/06 | 43/54.1 |
| 6,079,148 A * | 6/2000 | Yonenoi | A01K 97/06 | 43/57.1 |
| 6,193,062 B1 * | 2/2001 | Rysgaard | A01K 97/06 | 206/315.11 |
| 6,267,484 B1 * | 7/2001 | Baker | A01K 97/06 | 362/154 |
| 6,599,444 B2 | 7/2003 | Burnell-Jones | | |
| 6,684,557 B1 * | 2/2004 | Yu | A01K 85/01 | 250/459.1 |
| 6,922,935 B2 * | 8/2005 | Yu | A01K 85/01 | 43/17.6 |
| 6,981,780 B2 * | 1/2006 | Einav | B25H 3/02 | 362/154 |
| 7,055,983 B1 * | 6/2006 | Baker | A01K 97/06 | 362/154 |
| 7,080,920 B2 | 7/2006 | Fitzsimmons et al. | | |
| 7,089,698 B2 * | 8/2006 | Afshari | A01K 85/01 | 250/459.1 |
| 7,290,897 B2 * | 11/2007 | Schmidt | A01K 85/01 | 353/119 |
| 7,364,318 B1 * | 4/2008 | Cruze | A01K 85/01 | 362/154 |
| 8,016,106 B2 * | 9/2011 | Schmitt | A01K 97/06 | 206/315.11 |
| 8,424,235 B1 * | 4/2013 | Anderson | A01K 97/00 | 43/17.6 |
| 8,707,612 B2 * | 4/2014 | Konz | A01K 97/06 | 362/154 |
| 9,249,954 B2 * | 2/2016 | Johnson | A01K 85/01 | |
| 9,883,665 B2 * | 2/2018 | Heaton | A01K 97/06 | |
| 2007/0157505 A1 | 7/2007 | Dodge | | |
| 2009/0094881 A1 | 4/2009 | Konopa | | |
| 2016/0021861 A1 * | 1/2016 | Pippins | A01K 97/06 | 43/17.5 |
| 2017/0325441 A1 * | 11/2017 | Martin | A01K 97/06 | |

FOREIGN PATENT DOCUMENTS

| | | | | |
|---|---|---|---|---|
| JP | 2002360126 A * | 12/2002 | | |
| WO | WO-9921417 A1 * | 5/1999 | | A01K 97/00 |
| WO | WO-0156377 A1 * | 8/2001 | | A01K 97/06 |

\* cited by examiner

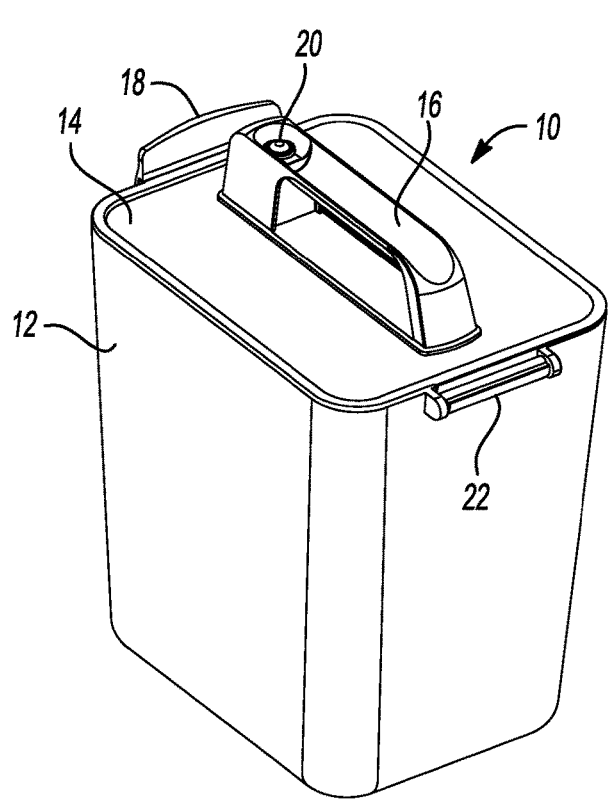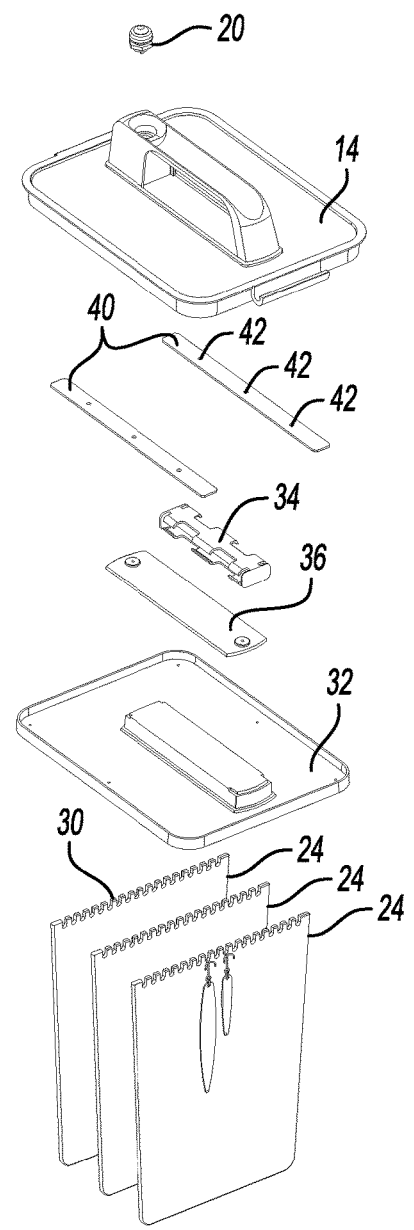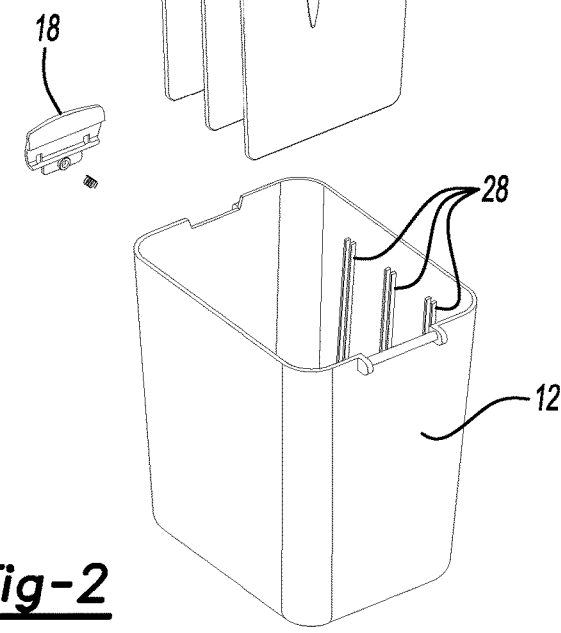
Fig-1
Fig-2

TACKLE BOX FOR CHARGING ELECTROLUMINESCENT LURES

TECHNICAL FIELD

This invention relates to fishing equipment, and more particularly a tackle box for charging electroluminescent lures.

BACKGROUND OF THE INVENTION

Electroluminescent lures are well known. The electroluminescent coatings on these lures are charged by absorbing light energy, and then glow when underwater as a fish attractant.

The prior art contains a number of illuminated tackle boxes. An exemplary embodiment is the illuminated tackle box disclosed in U.S. Pat. No. 5,333,408, which has an external lighting assembly. The light assembly includes an electric lamp for illuminating the interior of the tackle box when the lid is open, and electric lamp for illuminating the path of the person carrying the tackle box when the lid is closed.

The present invention addresses the need for a tackle box with the capability of charging electroluminescent lures in an energy efficient manner, while providing convenient packaging for accessing and storing such lures.

SUMMARY OF THE INVENTION

In a preferred embodiment the tackle box of this invention comprises a container having an interior volume; a cover mateable with the container; one or more racks for receiving and retaining lures, with each rack having (i) a substantially planar shape, (ii) being positionable in vertical tracks formed in the interior side walls of the container, and (iii) having an array of recesses formed in an upper end to hold lures by their hooks; a light-transmissive shelf positionable in the container above the one or more racks; and an array of light sources carried on the shelf and energizeable to illuminate electroluminescent lures retained on the one or more racks.

The tackle box may include a plurality of racks arrayed in parallel tracks.

The tackle box may include an array of recesses on the upper end of each rack that form a scallop pattern.

The tackle box may include one or more racks formed of light-transmissive material.

The tackle box may include an upper shelf co-extensive in surface area with the interior of the container.

The tackle box may include a battery pack carried on the shelf for energization of the light sources.

The tackle box may further include light sources comprising light emitting diodes.

The tackle box may further have light emitting diodes arrayed over the surface area of the light-transmissive shelf.

The tackle box may further comprise a switch for selective energization of the light sources.

BRIEF DESCRIPTION OF THE DRAWINGS

FIG. 1 is a perspective view of an assembled tackle box in a preferred embodiment of the present invention;

FIG. 2 is an exploded isometric view of the tackle box of FIG. 1;

DETAILED DESCRIPTION

Figure 3:
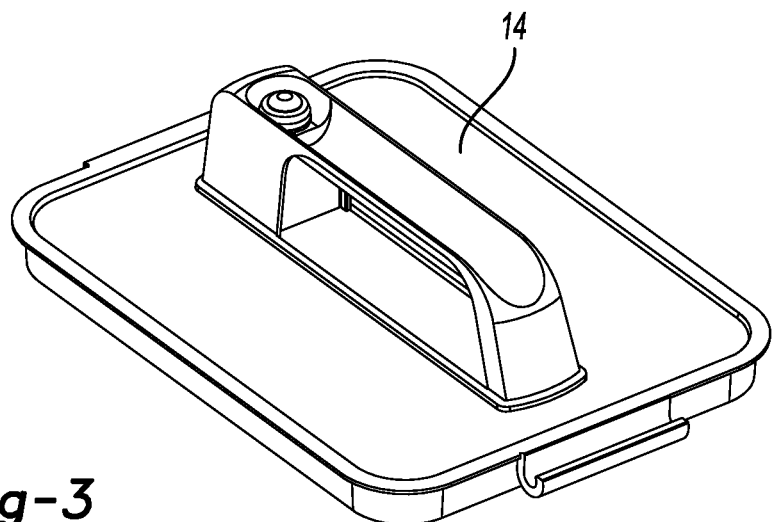
FIG. 3 is a perspective view of the tackle box cover.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIG. 1, a tackle box for charging electroluminescent lures is shown generally at 10. The tackle box 10 includes a container 12 with an interior volume. A cover 14 is mateable with the container 12, and functions as a closure member. The cover 14 has a conventional handle 16. The handle is fitted with a conventional push-push, on-off switch to control internal illumination of the tackle box 10. A hinge 18 connects the container 12 and cover 14, and allows the cover 14 to pivot between open and closed positions on the container 12. The hinge 18 may be spring-biased to the closed position. A handle 22 allows for separate transport of the container 12.

FIG. 2 shows the components of the tackle box 10 in an exploded isometric view. A set of three racks 24, each having a substantially planar shape, fit within complementary vertical tracks 28 formed in opposing interior side walls of the container 12. The racks 24, when installed, are arrayed in parallel within the container 12. Each rack has a pattern of recesses 30 along its top edge, preferably in the form of scallops. Each recess in the pattern is intended to receive and hold a conventional hook on a lure. The racks 24 are preferably formed of light-transmissive material to facilitate illumination within the interior volume of the container 12.

A shelf 32 of light-transmissive material, preferably transparent material, is positioned above the racks. A battery holder 34 is supported on a base 36 fitted with electrical terminals that supply energization to internal light sources. The battery holder 34 accepts conventional batteries, e.g., a set of four AA batteries.

A pair of light strips 40 are fitted with a spaced array of lights, preferably light emitting diodes (LEDs) 42. The LEDs are energized by batteries within the battery holder 34. The LEDs are in conductive contact with the terminals on the base 36, e.g., via wires (not shown). The light strips are carried on the shelf 32.

FIG. 3 shows the cover 14 apart from the tackle box assembly.

Figure 4:
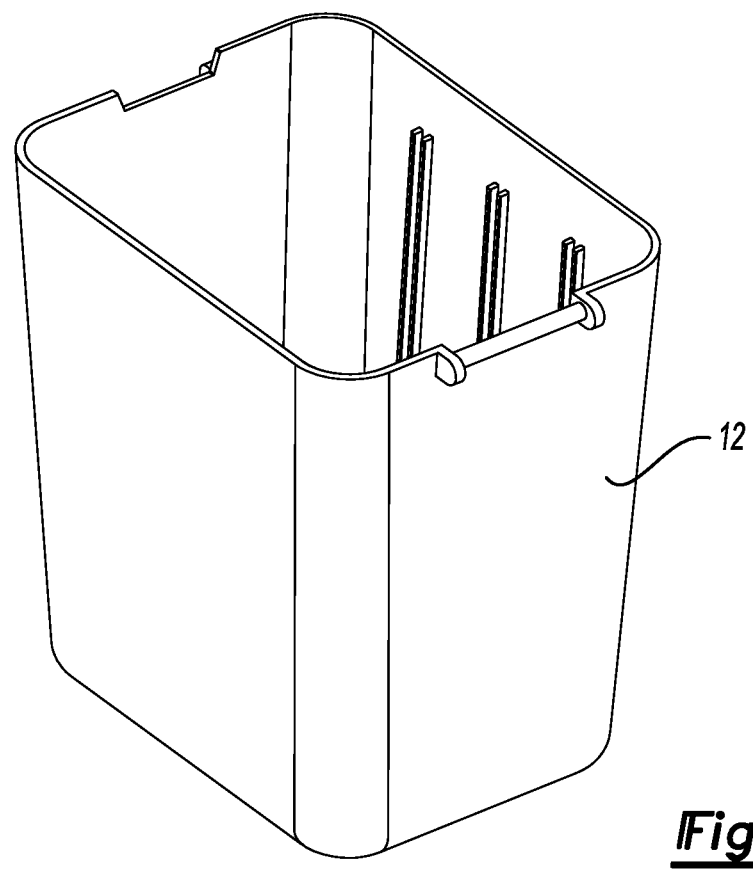
FIG. 4 is a perspective view of the tackle box container.

FIG. 4 shows the container 12 apart from the tackle box assembly.

Figure 5:
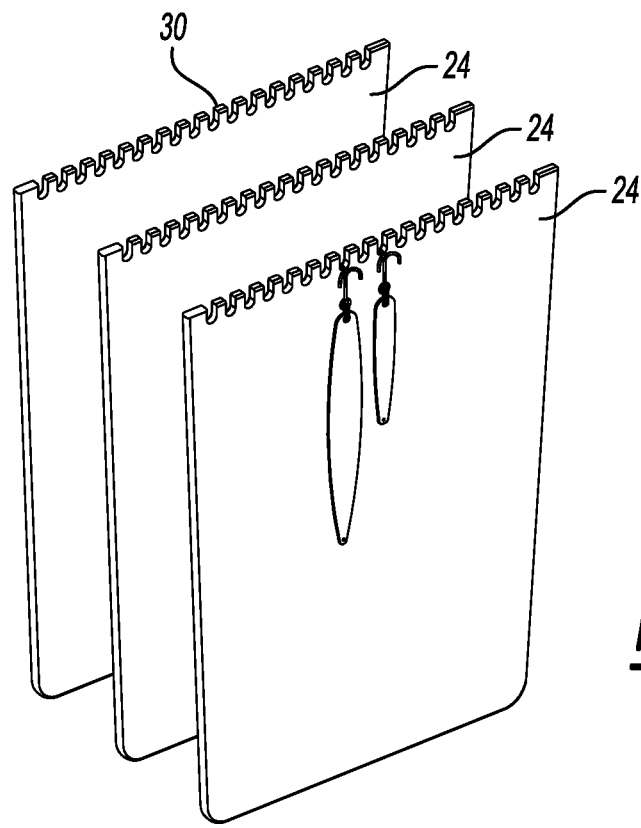
FIG. 5 is a perspective view of the racks which fit into the container.

FIG. 5 shows the parallel array of racks 24 with the scalloped recesses 30 at the top edge of each rack.

Figure 6:
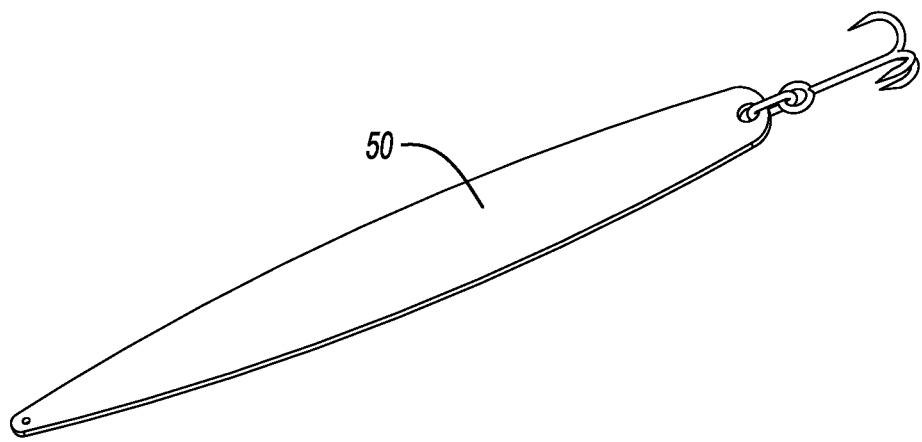
FIG. 6 is a view of a representative luminescent fishing lure for use with the tackle box of the present invention.

FIG. 6 shows a representative lure 50 with treble hooks that can be mounted on a rack 26 for charging.

Figure 7:
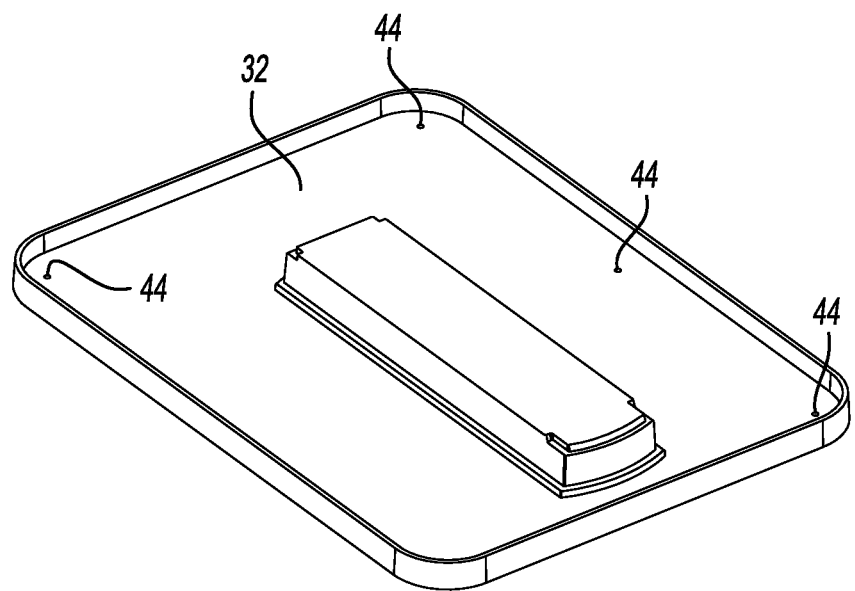
FIG. 7 is a perspective view of the light-transmissive shelf that mounts in the container above the racks.

FIG. 7 shows the transparent shelf 32 with apertures 44 in registering position with the LEDs 42 on the light strips 40 to facilitate illumination of the internal volume of the container 12.

Figure 8:
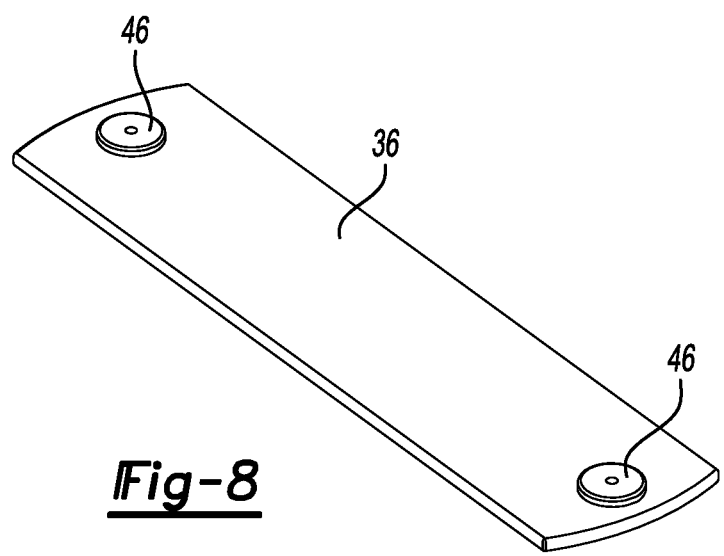
FIG. 8 is a perspective view of a base for a battery holder, the base being fitted with electrical terminals 46.

FIG. 8 shows the battery base 36, with end terminals, apart from the tackle box assembly.

Figure 9:
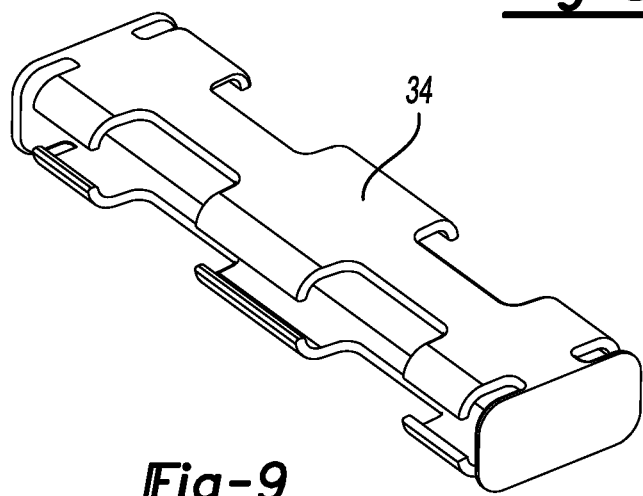
FIG. 9 is a perspective view of the battery holder.

FIG. 9 shows the battery holder 34 apart from the tackle box assembly.

Figure 10A:
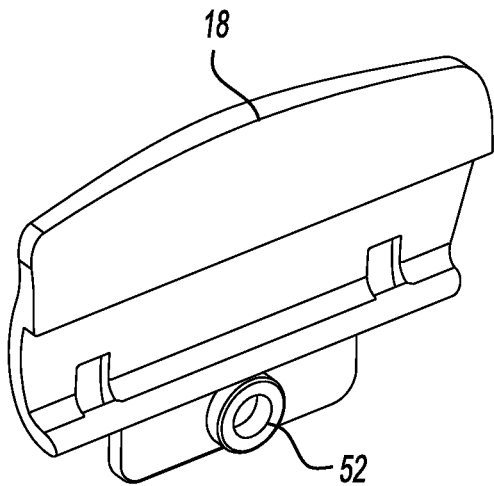
FIGS. 10A and 10B are front and rear perspective views, respectively of the hinge for securing the cover to the container.
Figure 10B:
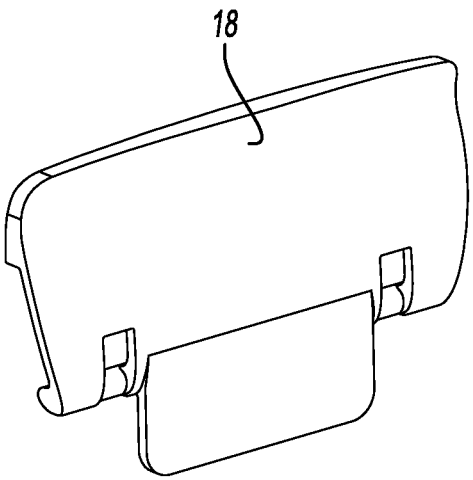
Figure 10C:
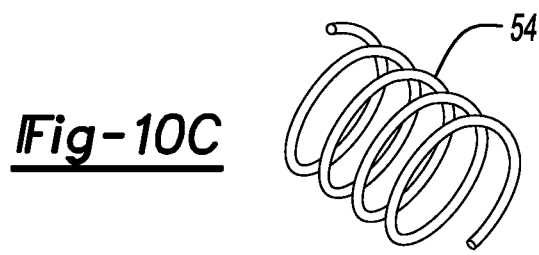
FIG. 10 C is a perspective view of a compression spring used to bias the cover to its closed position.

FIG. 10 A shows the interior side of the hinge 18 apart from the tackle box assembly. The interior surface is formed with a fitting 52 for receiving a compression spring 54 shown in FIG. 10C.

FIG. 10B shows the exterior side of the hinge 18 apart from the tackle box assembly.

FIG. 10C shows a compression spring 54 used to bias the cover to its closed position. The compression spring 54 is received within the complementary fitting 52 formed in the interior surface of the hinge 18.

Figure 11:
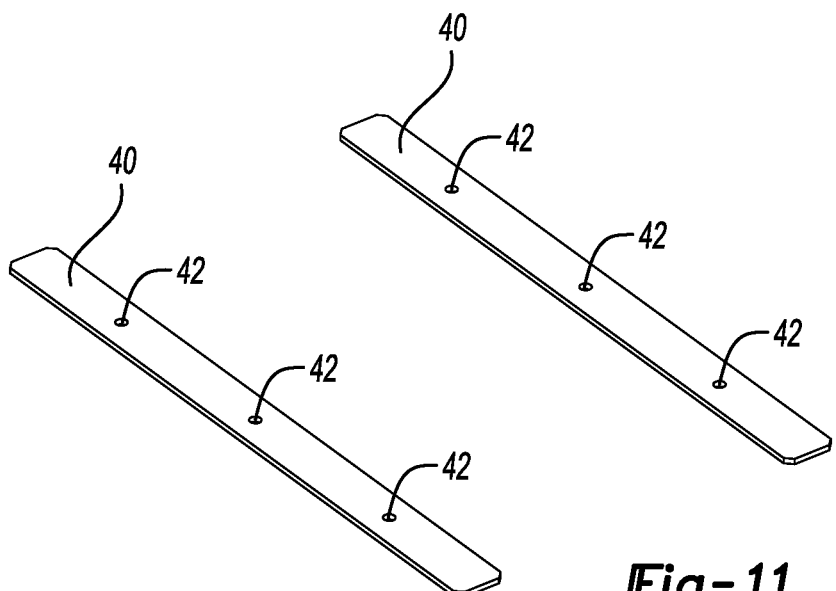
FIG. 11 is a perspective view of a pair of light strips fitted with light emitting diodes.

FIG. 11 shows light strips 40 fitted with a spaced array of light emitting diodes 42 that illuminate a luminescent lure 50 mounted in a recess on the scalloped upper edge 30 of a rack 26.

While exemplary embodiments are described above, it is not intended that these embodiments describe all possible forms of the invention. Rather, the words used in the specification are words of description rather than limitation, and it is understood that various changes may be made without departing from the spirit and scope of the appended claims. Additionally, the features of various implementing embodiments may be combined to form further embodiments of the invention.

The embodiments of the invention in which an exclusive property or privilege is claimed are defined as follows:

What is claimed is:

1. A tackle box kit comprising:
   a container having an interior volume;
   a cover mateable with the container and including a switch thereon;
   one or more racks for holding lures, each rack of the one or more racks—
      having a substantially planar shape,
      being positionable in a track formed on interior walls of the container, and
      having an array of recesses formed in an upper end thereof to hold lures;
   a light-transmissive shelf positionable in the container above the one or more racks; and
   light sources for placement on a top of the shelf in a fixed position and energizeable to illuminate electroluminescent lures when placed on the one or more racks, wherein the shelf carries a battery pack on top of the shelf and between the cover and the shelf, and wherein the switch on the cover controls current provided from the battery pack to the light sources.

2. A tackle box for charging electroluminescent lures comprising:
   a container having an interior volume;
   a cover mateable with the container and including a switch thereon;
   one or more racks for holding lures, each rack of the one or more racks—
      having a substantially planar shape,
      being positionable in a track formed on interior walls of the container, and
      having an array of recesses formed in an upper end thereof to hold lures;
   a light-transmissive shelf positionable in the container above the one or more racks; and
   light sources carried on the shelf between the cover and the shelf and energizeable to illuminate electroluminescent lures held on the one or more racks, wherein the shelf carries a battery pack between the cover and the shelf, and wherein the switch on the cover controls a supply of current from the battery pack to the light sources.

3. The tackle box of claim 2 wherein the one or more racks further comprising a plurality of racks and the track further comprising pairs of parallel tracks, wherein each rack of the plurality of racks is arrayed in one of the pairs of parallel tracks formed on the interior walls of the container.

4. The tackle box of claim 2 wherein the one or more racks is formed of light-transmissive material.

5. The tackle box of claim 2 wherein the shelf is substantially co-extensive in surface area with the interior of the container.

6. The tackle box of claim 2 wherein the light sources comprise light emitting diodes.

7. The tackle box of claim 6 wherein the light emitting diodes are arrayed over a surface area of the light-transmissive shelf.

8. The tackle box of claim 7 wherein the light-transmissive shelf is formed with apertures in registering position with the light emitting diodes to facilitate illumination of the one or more racks.

9. The tackle box of claim 7 wherein the light emitting diodes are positioned in one or more linear arrays aligned with the one or more racks to facilitate illumination of the one or more racks.

10. A tackle box for charging electroluminescent lures comprising:
   a container having an interior volume;
   a cover mateable with the container and including a switch thereon;
   one or more racks for holding lures, each rack of the one or more racks—
      having a substantially planar shape,
      being positionable in a track formed on interior walls of the container, and
      having an array of recesses formed in an upper end thereof to hold lures;
   a light-transmissive shelf positionable in the container above the one or more racks;
   an array of light sources carried on the shelf and energizeable to illuminate electroluminescent lures held on the one or more racks, wherein the shelf carries a battery pack on top of the shelf, and wherein the switch on the cover controls a supply of current from the battery pack to the light sources; and
   one or more electroluminescent lures.

* * * * *